(12) United States Patent
Burton, Jr. et al.

(10) Patent No.: US 8,121,854 B2
(45) Date of Patent: Feb. 21, 2012

(54) METHOD AND APPARATUS FOR COMPENSATING DEFIBRILLATOR OPERATORS FOLLOWING AN EVENT

(75) Inventors: Wayne Franklin Chip Burton, Jr., Huntington Beach, CA (US); Molly Ciliberti, Sammamish, WA (US); Lynda Christine Goodrich, Snohomish, WA (US); Ellen Frenkel, Bellevue, WA (US)

(73) Assignee: Physic Control, Inc., Redmond, WA (US)

( * ) Notice: Subject to any disclaimer, the term of this patent is extended or adjusted under 35 U.S.C. 154(b) by 1981 days.

(21) Appl. No.: 10/714,582

(22) Filed: Nov. 13, 2003

(65) Prior Publication Data
US 2004/0210258 A1 Oct. 21, 2004

Related U.S. Application Data

(60) Provisional application No. 60/426,121, filed on Nov. 13, 2002.

(51) Int. Cl.
*G06Q 10/00* (2006.01)
*G06Q 50/00* (2006.01)
(52) U.S. Cl. ......................................................... 705/2
(58) Field of Classification Search .................... 705/2–4
See application file for complete search history.

(56) References Cited

U.S. PATENT DOCUMENTS
2002/0013613 A1 * 1/2002 Haller et al. .................... 607/60
2004/0143297 A1 7/2004 Ramsey

OTHER PUBLICATIONS

Business Editors/Health & Medical Writers. ZOLL Medical announces multi-year agreement with Novation. New York: Aug. 24, 1999, pp. 1-2.*
Business Editors/Health & Medical Writers. HP to supply CodeMaster XL + the ForeRunner defibrillators to Carilion Health System. New York: Aug. 5, 1998, pp. 1-2.*
Davies, C. Sian, et al. Defibrillators in public places: the introduction of a national scheme for public access defibrillation in England. Resuscitation 52(2002), pp. 13-21.*
Smith, Sandy. Life-saving benefits of defibrillators outweigh liability concerns. Jun. 19, 2002. EHS Today.*

* cited by examiner

*Primary Examiner* — Sheetal R Rangrej
(74) *Attorney, Agent, or Firm* — Marger Johnson & McCollom PC

(57) ABSTRACT

Methods, devices, and business systems are provided for insuring those who might use a defibrillator against at least some of the costs of using the device in a medical emergency event. The insurance may be purchased in advance of an event occurrence, and then redeemed after an event where the defibrillator is used. In a further embodiment, the insurer may request reimbursement from a patient or patient's insurance company following defibrillator use with or without involving the owner of the defibrillator.

15 Claims, 6 Drawing Sheets

600

| TYPE OF REINBURSEMENT | PROVIDED: REPAIR OR REPLACEMENT | PREMIUM, IF AT TIME OF SALE | PREMIUM, IF LATER THAN SALE |
|---|---|---|---|
| SERVICE CALL | | | |
| DATA DOWNLOADED | | | |
| ELECTRODES | | | |
| BATTERY CHARGE | | | |
| [OTHER SUPPLIES] | | | |
| REFURBISHED DEFIBRILLATOR | | | |
| REPLACE DEFIBRILLATOR | | | |
| INSURANCE | | | |
| ETC. | | | |

| Type Of Reimbursement | PROVIDED: REPAIR OR REPLACEMENT |
|---|---|
| SERVICE CALL | Included, Within 36 Hours, On Location |
| DATA DOWNLOADED | Included |
| NEW ELECTRODES | Replacement, Two Packages |
| NEW BATTERY CHARGE | Replacement, One Charger |

Premiums: IF AT TIME OF SALE: $95/YEAR/DEFIBRILLATOR
IF AFTER THE SALE: $105/YEAR/DEFIBRILLATOR

FIG. 7

METHOD AND APPARATUS FOR COMPENSATING DEFIBRILLATOR OPERATORS FOLLOWING AN EVENT

PRIORITY CLAIM

This application claims priority of U.S. Provisional application Ser. No. 60/426,121 filed on Nov. 13, 2002, which is incorporated herein by reference.

BACKGROUND

1. Field of the Invention

The present invention is generally related to defibrillators, and more particularly relates to managing the costs associated with defibrillators.

2. Description of the Related Art

Sudden cardiac arrest (SCA) is a condition in which the heartbeat stops suddenly and unexpectedly; it is frequently debilitating or fatal. Indeed, SCA is one of the leading causes of death among American adults: it kills approximately 360,000 people a year—an astounding 1000 people a day. Two out of every three deaths caused by SCA happen outside of the hospital. It is unpredictable, and can happen to anyone, anywhere—even to a child, although risk increases with age. Although pre-existing heart disease is a common indicator of cardiac arrest, many patients have never had any heart problems.

SCA is caused by life-threatening abnormalities in the heart's electrical system called "arrhythmias". The most common arrhythmia is ventricular fibrillation. In this condition, the heart beats too chaotically to be effective in pumping blood to the body and brain. During SCA, the patient first loses his or her pulse, then consciousness, and finally the ability to breathe. Without immediate treatment, SCA is almost always fatal. It is therefore vital that treatment be administered as soon as possible to increase chances of survival. In the initial few minutes of the SCA incident, the probability of survival diminishes by about 10% for every minute.

Responding to an SCA incident usually requires specially trained paramedics and equipment, such as an Automated External Defibrillator (AED). A problem arises, however, in that paramedics may not arrive quickly enough to save the patient. Every minute of delay diminishes the probability of saving a life, and the problem is worse for remote or sparsely inhabited areas.

The non-medical public is slowly starting to appreciate, however, that defibrillators can be purchased and installed in places where many people congregate, or where obtaining emergency services is particularly problematic (e.g. on airplanes). Defibrillators are becoming increasingly installed in many other public and private facilities (e.g. office buildings, shopping malls, and even homes) as well. In addition, recent improvements make certain defibrillators usable by untrained people so that they are readily available in the event of a medical emergency.

Nevertheless, if a defibrillator is actually used in an event (e.g. a medical emergency), the costs of using the defibrillator can be significant. The defibrillator typically needs to be rechecked, for example, and some of its supplies may need to be refurbished, etc. Moreover, data stored in the defibrillator about the event may need to be downloaded, etc., thereby resulting in maintenance costs to the person or organization making the defibrillator available to the public.

A problem arises when a person is perceived undergoing an event, which could be an SCA event, and where there is no duty to the patient from the operator of the defibrillator. Examples of those instances are where a patient collapses on the street, just outside an establishment that is equipped with an AED. In such instances, the entity that owns a defibrillator actually has an economic dis-incentive to providing aid, since the owner may have to incur potentially significant costs as a result. A kind-hearted citizen or organization of limited means might therefore hesitate to offer assistance due to the economic costs of doing so, or become unduly economically burdened after offering assistance. While the patient may be legally obligated to compensate the person providing aid, the patient is in no position to promise to do so or negotiate prices prior to receiving the aid.

Accordingly, it is desirable to formulate systems and methods for mitigating the costs of offering aid to those in need, or at least sharing the costs of such aid across a larger population of contributors. Furthermore, other desirable features and characteristics will become apparent from the subsequent detailed description and the appended claims, taken in conjunction with the accompanying drawings and the foregoing technical field and background.

BRIEF DESCRIPTION

The present invention overcomes various limitations of the prior art. Generally, various embodiments of the invention provide methods, devices, and business systems for insuring those who might use a defibrillator against at least some of the costs of actually using the device in a medical emergency event. The insurance may be purchased in advance of an event occurrence, and then redeemed after an event where the defibrillator is used. In a further embodiment, the insurer may request reimbursement following defibrillator use with or without involving the actual owner of the defibrillator.

BRIEF DESCRIPTION OF THE DRAWINGS

The present invention will hereinafter be described in conjunction with the following drawing figures, wherein like numerals denote like elements.

FIG. 6 is a diagram showing an exemplary data structure for an insurance arrangement suitable for use with defibrillator insurance; and FIG. 7 is a diagram of an exemplary defibrillator insurance structure.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, a technique for mitigating the costs of defibrillator ownership suitably includes providing an insurance plan whereby a defibrillator owner, lessee or other operator pays a one-time or recurring premium to an insurer. In the event of a medical emergency requiring that the defibrillator be used, the Providing insurance for such events makes the cost of defibrillator ownership predictable. Without such predictability, the cost of operation may increase unpredictably over time. More importantly, however, by insuring against the costs of defibrillator use, the dis-incentive to providing aid in times of emergency is removed. Accordingly, defibrillator owners are not penalized for providing assistance even if the patient is a stranger, member of the public, or is otherwise unaffiliated with the owner.

Figure 1:
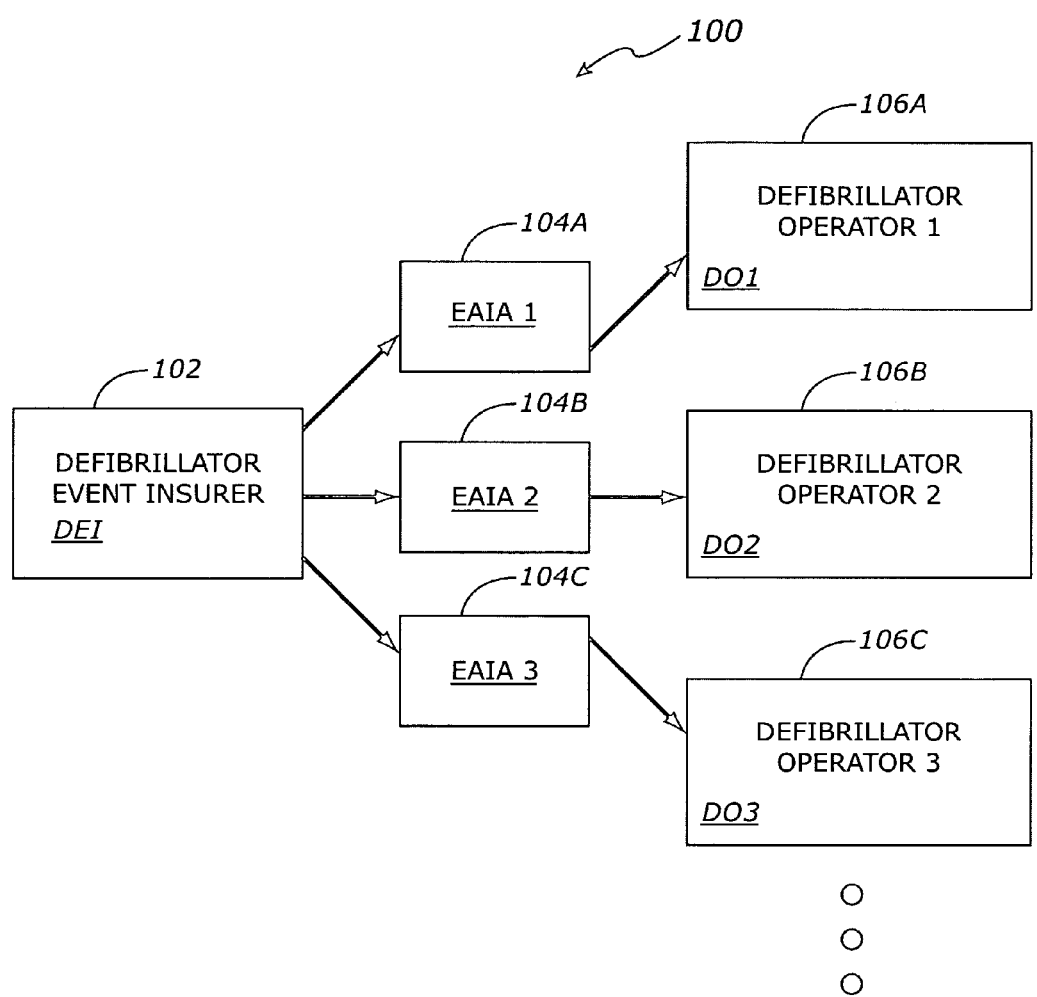
FIG. 1 is a block diagram of an exemplary system for insuring against defibrillator events.

Turning now to the drawing figures and with initial reference to FIG. 1, an exemplary system 100 for providing insurance suitably includes one or more insurers 102 establishing and maintaining event-activated insurance agreements (EA-IAs) 104A-C with one or more defibrillator operators 106A-C as appropriate. Insurer 102 is any person or organization capable of providing insurance to the various operators 106A-C. In various embodiments, insurer 102 is an insurance carrier or other third party. Alternatively, insurer 102 may be a defibrillator manufacturer, retailer and/or distributor, or any other party as appropriate. Similarly, operator 106 is any person, organization or other party capable of receiving, maintaining and/or operating a defibrillator device. Examples of operators 106 include airlines, building management firms, businesses and the like. In alternate embodiments, operators 106 are defibrillator dealers, brokers or other individuals or organizations. The term "operator", then, is intended to be read broadly as encompassing any party that bears the financial costs of operating a defibrillator.

Event-activated insurance agreements 104A-C are any electronic, tangible or other legally binding instruments capable of establishing an insurer/insured relationship between insurer 102 and operators 106A-C. Agreements 104A-C set forth the terms and conditions of the relationship between the parties to the agreement. In various embodiments, agreements 104A-C are tangible agreements signed between each party. Alternatively, agreements 104A-C may be "click-thru" agreements activated via the Internet or another medium.

The actual agreements 104A-C may be any type of two party, three party or multiple party agreement signed or activated in any context. Insurance may be provided from a manufacturer to an operator 106 via a distributor, agent or other third party, for example, or indeed insurance may be provided from an insurance company (e.g. any conventional carrier of home, auto, health, life, liability, disability or other insurance) to an operator 106, with the defibrillator manufacturer or distributor acting as an agent or distributor for the insurance. Still further, insurance agreement 104 may be incorporated into other agreements existing between insurer 102 and insured/operator 106. Insurance agreement 104 may be incorporated into a leasing contract, for example, with the leaser also acting as insurer 102, or as an agent for insurer 102. Alternatively, insurance agreement 104 may be incorporated into or otherwise combined with an annual maintenance contract for the defibrillator, as appropriate. In still other embodiments, insurance 104 is provided in conjunction with general liability insurance, homeowners insurance or other general insurance covering public or private premises.

Typical terms and conditions that might be incorporated into various insurance agreements 104 include fees for the insurance and a period of time for which the insurance is valid. Fees may be collected in any temporal manner, including on a monthly, yearly or other regular basis, or may be collected in one or more lump sums at any time (e.g. upon execution of agreement 104). In various embodiments, insurance contract 104 is established and fees are collected in conjunction with defibrillator lease payments or upon initial purchase of the defibrillator. Agreements 104 will also define the terms upon which insurer 102 will see that operator 106 is re-imbursed or otherwise compensated for some or all of the costs incurred as a result of defibrillator use. Compensation may be in the form of monetary re-imbursement for actual or estimated expenditures, for example. Alternatively, insurer 102 may provide labor and/or materials for restoring the defibrillator to a useable condition. The insurance described in any agreement 104 may cover a single defibrillator or a group of any number of defibrillators. The insurance be structured to be limited to specific people (e.g. intended family members, or tenants of a building), and/or to one or more specific locations (e.g. a particular building or buildings, or to particular aircraft, for example), although such limitations are optional and may not be found in all embodiments.

In operation, then, insurance system 100 allows one or more insurers 102 to insure operators 106 against the financial costs of re-furbishing or restoring the defibrillator after a medical event. If an event occurs, insurer 102 restores the defibrillator to its desired state without additional cost (or with only a minimal cost, e.g. a deductable amount) provided by the insured operator 106.

Figure 2:
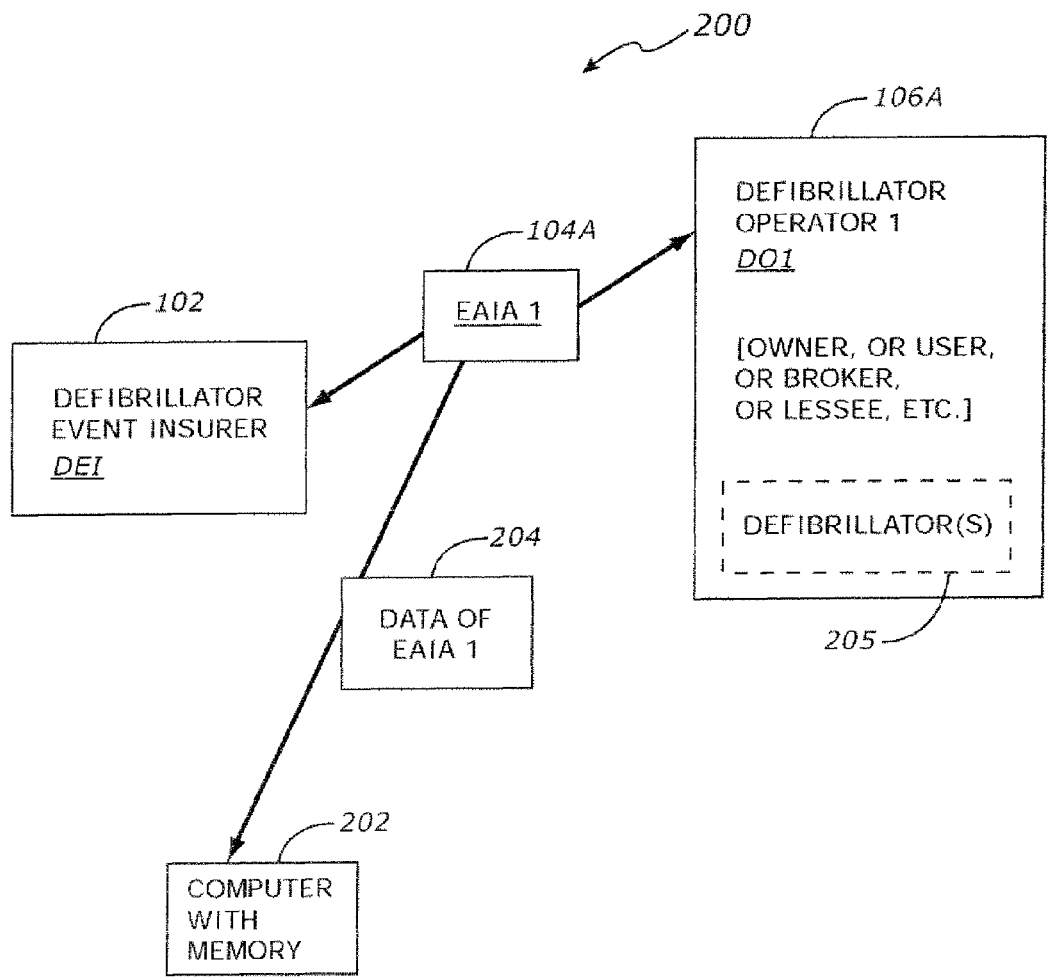
FIG. 2 is a block diagram of an exemplary computer-based system for insuring against defibrillator events.

With reference now to FIG. 2, various portions of the insurance system 200 may be implemented with a digital computer 202. For example, terms or data 204 relating to the various agreements 104A-C may optionally be stored in a computer. Further, solicitations, offers and acceptances for insurance agreements 104A-C may optionally be made in a digital environment, e.g. via a website or other networked application.

Digital computer 202 is any computing device or system capable of storing and/or processing data related to the sale, execution and/or operation of insurance agreements 104. Accordingly, computer 202 typically includes one or more microprocessors with associated memory, as well as mass storage (e.g. a disk drive or access to a networked drive) and input/output functionality. Instructions and data 204 are appropriately stored in a hard drive or other mass storage device that is accessible to computer 202 for storage and retrieval of data 204. Additional detail of exemplary data 204 that may be stored in a computer system 202 is described below. In further embodiments, computer 202 may be coupled to a digital network such as a private or public network. In such embodiments, computer 202 may include conventional server software for providing a web server and browser interface so that potential customers/operators 106 can purchase insurance contracts 104. Such embodiments may also include the capability to accept credit card, debit card, smartcard or other forms of payment such that operators 104 may provide payment and obtain insurance agreements 104 via computer system 202. By using a digital computer, an insurer 102 may be able to accurately and reliably track and implement insurance agreements 104 for any number of operators 106, each having any number of defibrillators 205.

Figure 3:
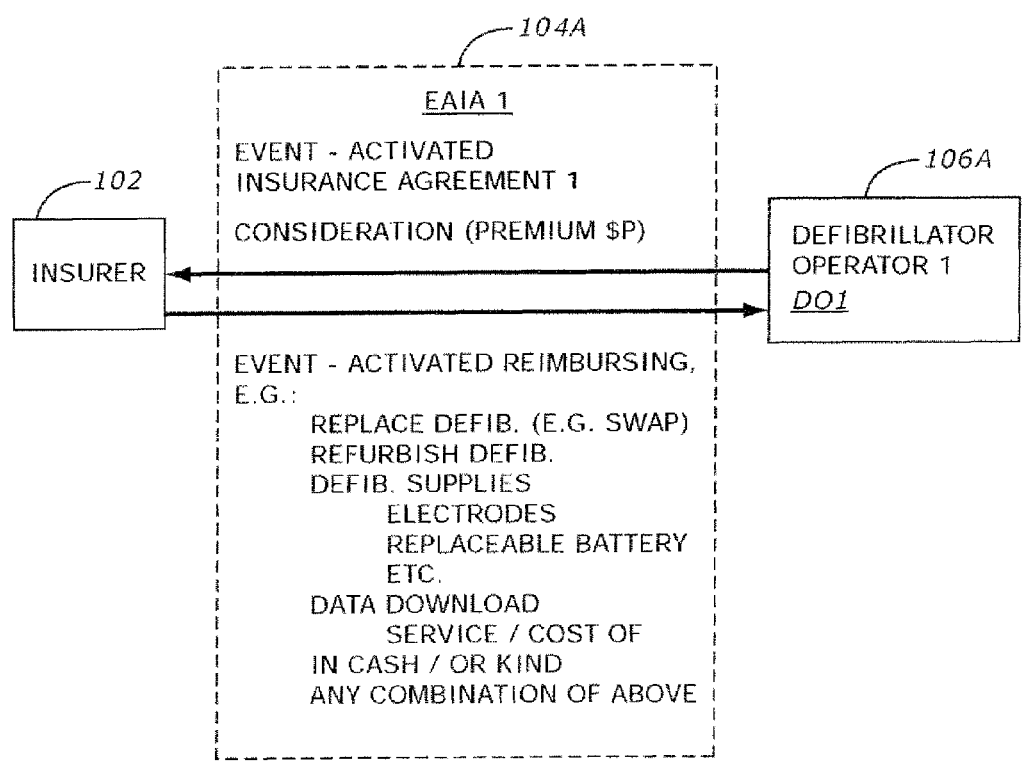
FIG. 3 is a block diagram showing additional detail of an exemplary insurance agreement.

With reference now to FIG. 3, additional detail about an exemplary event-activated insurance agreement 104 is provided. A consideration 302 is paid from one or more operators 106 to insurer 102 in the form of a premium ($P). If there is an event that justifies the use of the insured defibrillator, there is reimbursement 304 by insurer 104.

The event may be defined by insurance agreement 104 and may correspond to any occurrence wherein the defibrillator is used. "Used" in this sense could include placing the electrodes and taking an electrocardiogram (ECG) of a patient, applying shock therapy, or any other action. Reimbursement may be attuned to the extent of use, or may be pre-defined to be any fixed amount.

Reimbursement, for purposes of this document, means either monetarily compensating and/or actually performing any and all related activities to compensate operator 104 in whole or in part, following the use of the defibrillator. In various embodiments, "reimbursement" includes refurbishing the defibrillator, replacing the defibrillator, merely testing the defibrillator for recertification, downloading data from the defibrillator or any other action relevant to the circumstances of agreement 104 and the event that occurred. Other insurance agreements may also include routine maintenance for the defibrillator (e.g. periodic checks, repairs as needed, and the like). Any acts of reimbursement may be done by the insurer, and/or contracted out to a service agency or another third party.

Replacing the defibrillator may involve replacement with another defibrillator of the same or a comparable model. Alternatively, insurer 102 may "replace" the defibrillator pay paying a cash amount corresponding to the purchase price of the defibrillator, a replacement cost of a new defibrillator, and/or a prorated price reflecting time passage form when the defibrillator was purchased until it was used.

In various embodiments, "refurbishing" the defibrillator may involve replenishing consumed items (e.g. batteries, paddles, electrodes, etc.) and performing whatever checking is required and/or recommended after use. Refurbishing could be done in the field by the owner or a maintenance service, and/or it could be done by the manufacturer. Alternatively, operator 106 may ship or otherwise transport the used defibrillator to a manufacturer or service agent for refurbishing.

Figure 4:
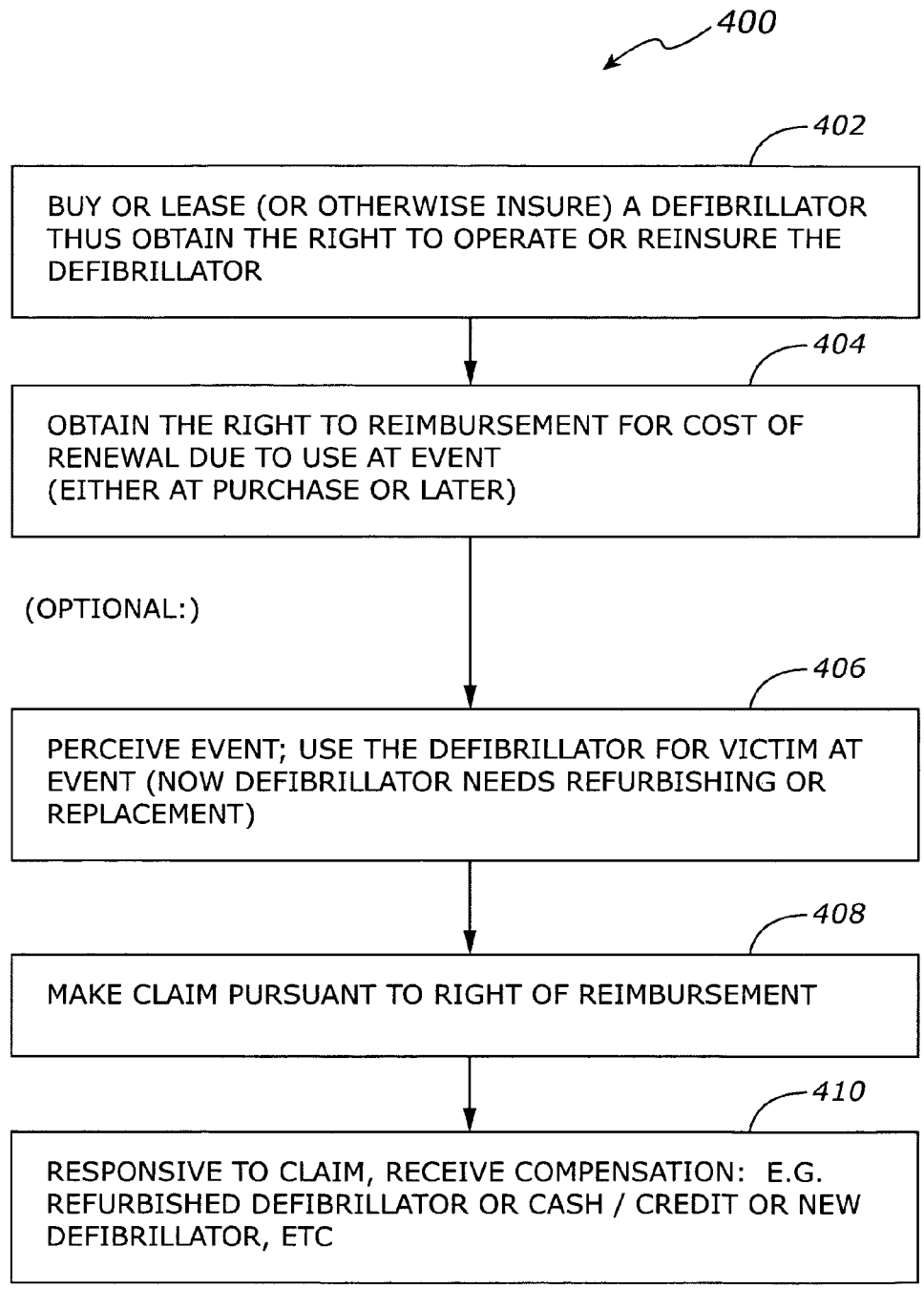
FIG. 4 is a flowchart for an exemplary process for insuring against defibrillator use.

Referring now to FIG. 4, a flowchart is used to illustrate a method 400 of operating an insurance program for one or more defibrillators. Method 400 may be executed by any person or organization, and may be processed manually or with a digital computer in a wide array of alternate embodiments.

According to an optional step 402, in one embodiment, an operator 106 buys or leases a defibrillator. In alternate embodiments, process 400 is initiated days, weeks, months or years after a defibrillator has been purchased.

According to step 404, the buying entity (or leasing entity or a middleman) acquires an additional contractual right contrasted from the prior art. The contractual right is that, if the defibrillator is used in an attempt to rescue someone, some reimbursement will be given back from the cost of renewal. The additional right may cost an additional amount beyond the cost of the defibrillator, e.g. a premium, or may be incorporated into the cost of the defibrillator.

The insurance may be acquired at the time of purchase or lease. Also, the insurance may be acquired for an existing, installed defibrillator. If instead the defibrillator is provided in terms of a lease, then the premium may be incorporated in the rent or lease payment. Or a combination scheme may be provided, where if a defibrillator is bought, then leased, the premium is paid up front, and the warranty extends to the one who rents it. The lease may or may not include other items such as training, periodic maintenance, deployment studies, emergency medical system activation on defibrillator use, etc.

According to an optional next step 406, an event is perceived wherein the covered defibrillator is used, thereby generating a need for refurbishing or replacement, data downloads, etc. The event may be perceived by insurer 102 through notification from operator 106 via telephone, email, fax or the like. Alternatively, various defibrillators may have the capability of notifying insurer 102 automatically upon use via a wired or wireless phone or network connection or the like.

In step 408, a claim may be made to exercise the right to reimbursement established by contract 104. Such a claim may be combined with the notification provided in step 406, or may be otherwise provided.

According to a next step 410, compensation (reimbursement) is received responsive to the claim provided in step 406 and/or step 408. The claim may be manually or automatically reviewed prior to reimbursement to verify that premium payments have been made, that the claim is made for events occurring during a period of coverage, or the like.

Figure 5:
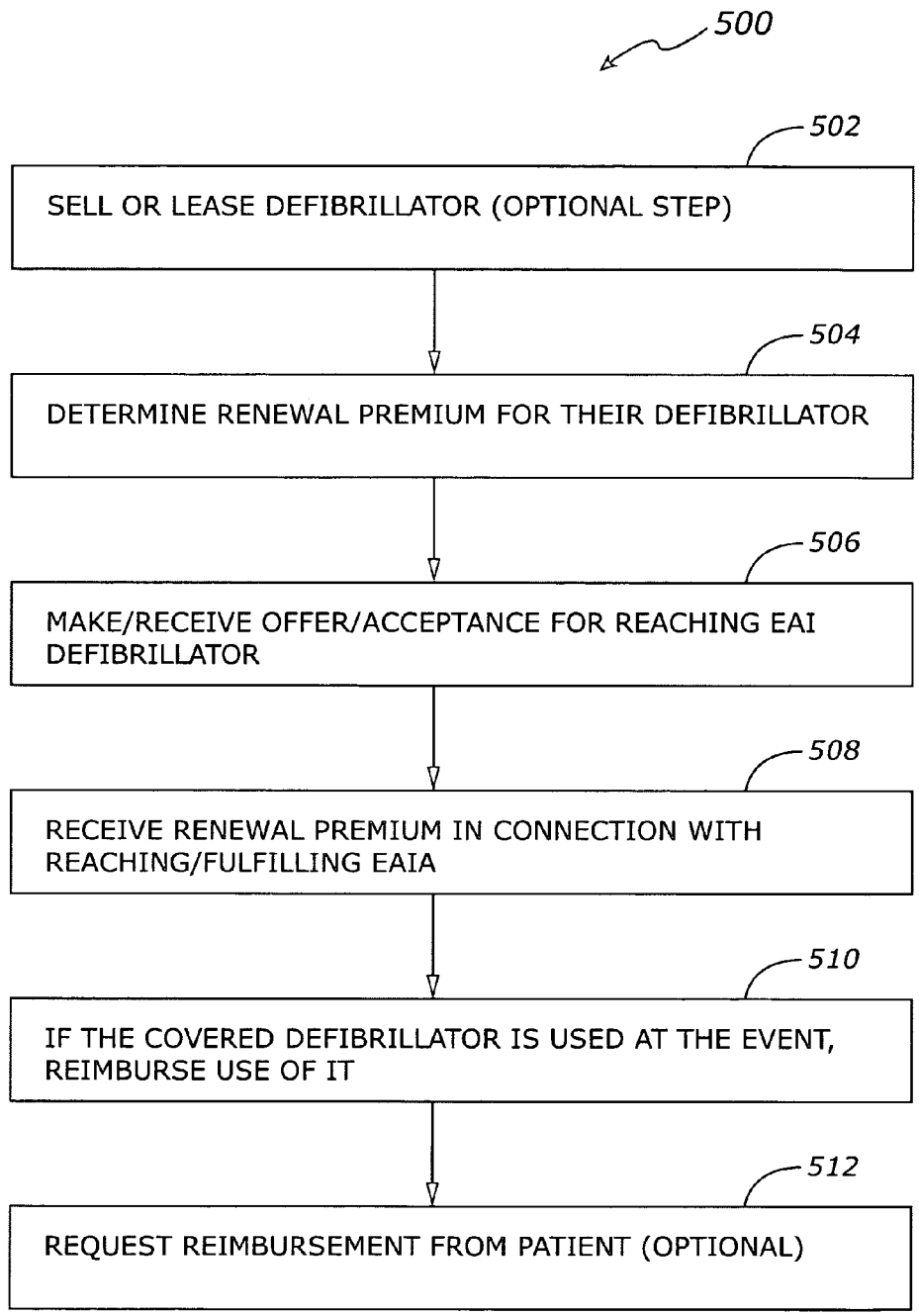
FIG. 5 is a flowchart of an alternate exemplary process for insuring against defibrillator use.

Referring now to FIG. 5, a flowchart is used to illustrate an exemplary alternate method 500 of establishing and operating a defibrillator insurance relationship. Method 500, like method 400 described above, may be practiced manually by a person or organization; alternatively, some or all of the steps described may be implemented with a digital computer 202 (FIG. 2).

According to an optional initial step 502, a defibrillator is sold or leased to operator 106. Step 502 is performed in some embodiments where the insurance of the invention is procured at the time of purchase or lease. In other embodiments, the insurance is acquired for an existing, installed defibrillator.

At some point during or after purchase or lease of a defibrillator, a monetary amount (i.e. premium) is determined (step 504). The amount of this premium may be based upon a pre-determined time period for coverage, the number of insured defibrillators, or any other factors. Other factors that may be considered include, among others, the cost of the defibrillator, and thus its renewal after use (refurbishing or replacement), and the probability that a particular one defibrillator will actually be used (amount human traffic, medically indicated activity, activities in that area), the costs to repair or replace the insured defibrillator(s), the remoteness of the defibrillator location(s) and/or any other factors. Due to the statistical nature of SCAs, the premium may turn out to be much smaller than the purchase price of the defibrillator, and may be included with or in addition to annual/periodic maintenance fees for the defibrillator.

As briefly mentioned above, the premium may be selected to correspond to an appropriate period of time (e.g. one month, year, etc.). Accordingly, at the expiration of this period of time, another premium may become due. As part of step 504, insurer 102 may send an invoice or other reminder to operator 106 prior to the expiration of the time period. Typically, the insurance agreement 104 remains in force only for such time as the premium has been paid. Accordingly, events occurring during the period of time that the agreement is in force will be reimbursed, whereas events occurring before or after the effective period of time will not be reimbursed. "Period of time" is also intended to include insurance agreements 104 that remain in effect in perpetuity, or for a period of time that is not expressly defined in the agreement. Accordingly, "period of time" should be read broadly to include open-ended periods of time without set times of expiration.

In step 506, EAIA 104 is established between operator 106 and insurer 102. The agreement is typically established using conventional notions of offer and acceptance, etc. and may be consummated in person, across a digital network, via facsimile or the like.

In step 508, the premium is received in connection with reaching at the EAIA. The insurance premium may be periodic, or one-time as discussed above. If one-time, it may be embedded in the purchase price, or be an explicit extra charge in alternate embodiments.

According to step 510, if the insured defibrillator is used in a covered event, the user is reimbursed according to the EAIA 104, as set forth more fully above.

In a further embodiment, insurer 102 may optionally present a request for reimbursement to the patient and/or the patient's representative for defibrillator costs incurred during the event (step 512). In the event that compensation from the patient is requested, the request is either from the patient, the patient's estate or other agent, the patient's insurance company, the manufacturer or distributor (unconditionally or as part of a service contract), a state fund, any combination of the above and/or any other source. Alternately, premiums may be set to where no expectation of reimbursement will be requested.

Thus, the profit of the DEI is the premiums plus the possible reimbursement of step 512, less the reimbursement payouts of step 510 and the costs of administering the system. Various embodiments are practiced by various sellers, resellers, lessors, or other entities that offer "renewal insurance" (even if disguised as a "warranty", or just checking warranty for a reduced cost) against the possibility of actual use of a defibrillator.

In a further embodiment, the amount of the premium charged by an insurer 102 varies according to the level of service provided. Referring now to FIG. 6, a table is shown for illustrating the various premiums that may be offered with respect to the types of agreements 104 that may be offered. Different premiums may be charged for various services, for example, or for the time at which the contract is entered. Moreover, the premium may vary depending on whether the agreement 104 is for covering defibrillators that are "known" and can be check/refurbished repaired (e.g. of a familiar or cooperating manufacturer), from those that are not known.

With final reference to FIG. 7, an exemplary embodiment of an insurance program 700 suitably provides insurance 104 against use of one or more defibrillators under particular terms and conditions. One example of such a program is the LIFEPAK® CR PLUS AED program available from Medtronic Physio Control, which is provided as part of an optional annual service agreement provided by the manufacturer, and is implemented on a "per device" basis. In this exemplary embodiment, the cost for insurance coverage is $95 per device at the point of sale, or $150 after the sale. The operator/customer is provided with a toll free number to call to report events, for questions and/or for other issues that may arise.

Within an agreed period of time (e.g. 36 hours or so) following an event, a field technician responds to perform replenishment of supplies (e.g. to install two new sets of electrodes, a battery charge pack, etc.), performs an equipment inspection, and provides a data download for the customer in hard copy and/or electronic format. Other embodiments may vary significantly from the terms and conditions described herein; for example, the insurance may be limited to a particular period of time, or different levels of reimbursement may be provided.

While at least one exemplary embodiment has been presented in the foregoing detailed description, it should be appreciated that a vast number of variations exist. The concepts described herein with respect to watercraft, for example, are readily applied to aircraft and to other vehicles traveling through fluid media such as air or water. Similarly, the various mechanical structures described herein are provided for purposes of illustration only, and may vary widely in various practical embodiments. Accordingly, the various exemplary embodiments described herein are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that numerous changes can be made in the selection, function and arrangement of the various elements without departing from the scope of the invention as set forth in the appended claims and the legal equivalents thereof.

What is claimed is:

1. A method of compensating an operator of an external defibrillator for expenses incurred as a result of use of the defibrillator for the benefit of another party to whom the operator has no duty to provide use of the defibrillator, the method comprising:
   receiving a pre-determined monetary amount as a premium from the operator;
   maintaining a contractual relationship with the operator for a period of time in exchange for the pre-determined monetary amount, the contractual relationship including a requirement to reimburse the operator for at least a portion of the expenses incurred by the operator as a result of the defibrillator being used for the benefit of the other party;
   determining, with a computing system, that the external defibrillator was used for the benefit of the other party during the period of time; and
   in response to the determination, reimbursing the operator, in accordance with the contractual relationship and with the computing system, for the at least a portion of the expenses incurred by the operator as a result of the defibrillator being used for the benefit of the other party.

2. The method of claim 1 wherein the maintaining step comprises maintaining contractual relationships with a plurality of operators.

3. The method of claim 2 further comprising allocating the expenses across the plurality of operators.

4. The method of claim 1 wherein receiving the pre-determined monetary amount comprises receiving the pre-determined monetary amount from the operator upon purchase of the defibrillator by the operator.

5. The method of claim 4 wherein receiving the pre-determined monetary amount comprises receiving the pre-determined monetary amount at a regular interval corresponding to the period of time.

6. The method of claim 5 wherein the regular interval further corresponds to a period of contract for maintenance of the defibrillator.

7. The method of claim 5 wherein the period of time is annually.

8. The method of claim 5 wherein the period of time is monthly.

9. The method of claim 4 wherein receiving the pre-determined monetary amount comprises receiving the pre-determined monetary amount in conjunction with receipt of a lease payment for the defibrillator.

10. The method of claim 1 further comprising requesting compensation for the reimbursement from the other party.

11. The method of claim 1 wherein the period of time continues in perpetuity.

12. The method of claim 1 further comprising seeking compensation for the reimbursement from an insurance carrier associated with the other party.

13. A computing system comprising:
- means for receiving a pre-determined monetary amount as a premium from an owner of an external defibrillator;
- means for maintaining a contractual relationship with the owner for a period of time in exchange for the pre-determined monetary amount, the contractual relationship including a requirement to compensate the owner for at least a portion of expenses incurred by the owner as a result of the external defibrillator being used;
- means for determining that the external defibrillator was used to at least one of monitor or treat another party during the period of time; and
- means for compensating the owner, in response to the determination by the means for determining and in accordance with the contractual relationship, for the expenses incurred as a result of the use of the defibrillator to at least one of monitor or treat the other party.

14. A data processing system comprising:
- first computing means for receiving premium payments from each of a plurality of operators of a respective one or more of a plurality of external defibrillators;
- second computing means for maintaining contractual relationships with the plurality of external defibrillator operators for a period of time in exchange for the premium payments, each contractual relationship comprising a requirement to reimburse the respective operator for at least a portion of costs incurred by the operator as a result of one of the defibrillators being used;
- third computing means for determining that the one of the external defibrillators was used to at least one of monitor or treat another party during the period of time; and
- fourth computing means for providing reimbursement to one of the plurality of external defibrillator operators, in response to the determination by the third computing means and in accordance with the contractual relationship, for the at least a portion of the costs associated with the use of the external defibrillator during the period of time incurred by the operator.

15. The method of claim 1, wherein the expenses incurred as a result of the external defibrillator being used to benefit the other party include at least one of restoring the external defibrillator, refurbishing the external defibrillator, or replacing the external defibrillator with a different external defibrillator.

* * * * *

UNITED STATES PATENT AND TRADEMARK OFFICE
CERTIFICATE OF CORRECTION

PATENT NO. : 8,121,854 B2
APPLICATION NO. : 10/714582
DATED : February 21, 2012
INVENTOR(S) : Wayne Franklin Chip Burton, Jr. et al.

Page 1 of 1

It is certified that error appears in the above-identified patent and that said Letters Patent is hereby corrected as shown below:

On the title page item (73), Assignee should read "Physio-Control, Inc."

Signed and Sealed this
Twentieth Day of March, 2012

David J. Kappos
*Director of the United States Patent and Trademark Office*